United States Patent

Brauner et al.

(10) Patent No.: US 7,114,279 B2
(45) Date of Patent: Oct. 3, 2006

(54) FISHHOOK BARB CRIMPING TOOL

(75) Inventors: Bill Brauner, Los Altos, CA (US); Brent Brauner, Los Altos, CA (US)

(73) Assignee: Streamworks, LLC, Palo Alto, CA (US)

( * ) Notice: Subject to any disclaimer, the term of this patent is extended or adjusted under 35 U.S.C. 154(b) by 0 days.

(21) Appl. No.: 10/979,521

(22) Filed: Nov. 2, 2004

(65) Prior Publication Data

US 2005/0204605 A1 Sep. 22, 2005

Related U.S. Application Data

(60) Provisional application No. 60/554,854, filed on Mar. 19, 2004.

(51) Int. Cl.
*A01K 97/00* (2006.01)
*A01K 97/18* (2006.01)

(52) U.S. Cl. ............... 43/4; 43/53.5; 7/106; 81/420; 81/421; 81/423

(58) Field of Classification Search ............ 43/4, 43/53.5; 7/106; 606/205–208; 81/318–320, 81/324, 418, 420–423
See application file for complete search history.

(56) References Cited

U.S. PATENT DOCUMENTS

| | | | | |
|---|---|---|---|---|
| 505,835 A * | 10/1893 | Kulp et al. | ............... | 81/421 |
| 831,477 A * | 9/1906 | Sandall | ............... | 81/418 |
| 864,558 A * | 8/1907 | Richter | ............... | 606/208 |
| 1,022,489 A * | 4/1912 | Lyons | ............... | 81/418 |
| 1,069,106 A * | 8/1913 | Brice | ............... | 81/324 |
| 1,161,526 A * | 11/1915 | Porter | ............... | 30/193 |
| 1,177,303 A * | 3/1916 | Carski | ............... | 81/423 |
| 1,219,857 A * | 3/1917 | Parkhurst | ............... | 81/418 |
| 1,623,689 A * | 4/1927 | Lind | ............... | 81/420 |
| 1,918,889 A * | 7/1933 | Bacon | ............... | 606/207 |
| 2,086,863 A * | 7/1937 | Geddes | ............... | 83/605 |
| 2,531,522 A * | 11/1950 | Malouf | ............... | 43/53.5 |
| 2,597,394 A * | 5/1952 | Snowden | ............... | 43/53.5 |
| 2,669,992 A * | 2/1954 | Curutchet | ............... | 606/205 |
| 2,853,908 A * | 9/1958 | Logan | ............... | 81/423 |
| 2,895,478 A * | 7/1959 | Post | ............... | 81/418 |
| 3,106,035 A * | 10/1963 | Tennyson | ............... | 43/53.5 |
| 3,214,859 A * | 11/1965 | Watkins | ............... | 43/53.5 |
| 3,581,424 A * | 6/1971 | Bloom | ............... | 43/4 |
| 3,601,386 A * | 8/1971 | Estep | ............... | 81/420 |
| 3,624,690 A | 11/1971 | Ashley | | |
| 3,675,359 A * | 7/1972 | Ohno | ............... | 43/53.5 |

(Continued)

FOREIGN PATENT DOCUMENTS

AU 200071657 A * 5/2001

(Continued)

*Primary Examiner*—Darren W. Ark
(74) *Attorney, Agent, or Firm*—Pitts & Brittian, PC

(57) ABSTRACT

A tool for crimping the barb defined by a conventional fishhook is disclosed. The tool includes a pair of forceps on which is carried a barb crimping element. The tool is provided for modifying a conventional fishhook to allow a fisherman to catch fish in a catch-and-release manner without causing undue harm to the fish. The tool is a pair of forceps adapted to include a fishhook barb crimping device. The barb crimping element includes a first head carried by the first arm and a second head carried by the second arm. The first and second heads are configured to define an interior face, the two interior faces being configured to cooperate to engage when the finger loops are engaged toward a locked position.

9 Claims, 2 Drawing Sheets

U.S. PATENT DOCUMENTS

| | | | | |
|---|---|---|---|---|
| 3,786,815 | A * | 1/1974 | Ericson | 606/207 |
| 3,791,032 | A * | 2/1974 | Rogers | 30/271 |
| 3,841,014 | A | 10/1974 | Thomas, Jr. et al. | |
| 3,921,640 | A * | 11/1975 | Freeborn | 606/158 |
| 3,921,641 | A * | 11/1975 | Hulka | 606/208 |
| 4,088,134 | A * | 5/1978 | Mazzariello | 606/207 |
| 4,152,797 | A * | 5/1979 | Wells, Jr. | 7/129 |
| 4,570,373 | A | 2/1986 | Brief | |
| 4,625,595 | A * | 12/1986 | Hsiao | 81/324 |
| 4,631,855 | A * | 12/1986 | Ader | 43/53.5 |
| 4,858,371 | A | 8/1989 | Preiser | |
| 4,896,661 | A * | 1/1990 | Bogert et al. | 606/207 |
| 4,899,482 | A * | 2/1990 | Gerdes | 43/4 |
| 4,998,375 | A | 3/1991 | Mitchell | |
| 5,019,092 | A * | 5/1991 | Klintmalm | 606/207 |
| 5,097,622 | A | 3/1992 | James | |
| 5,163,245 | A * | 11/1992 | Russell | 43/43.16 |
| 5,207,012 | A * | 5/1993 | Lael | 43/4 |
| 5,336,228 | A * | 8/1994 | Cholhan | 606/207 |
| 5,472,450 | A * | 12/1995 | Mena | 606/205 |
| 5,497,522 | A * | 3/1996 | Chen | 7/128 |
| 5,528,850 | A * | 6/1996 | Lindstrom | 43/43.16 |
| 5,557,874 | A * | 9/1996 | Pietrandrea et al. | 43/4 |
| 5,685,108 | A | 11/1997 | LePage et al. | |
| 5,983,555 | A | 11/1999 | Biel | |
| 6,061,858 | A * | 5/2000 | Shepard | 43/4 |
| 6,205,699 | B1 * | 3/2001 | Bogni | 43/53.5 |
| 6,272,709 | B1 * | 8/2001 | Strini | 43/4 |
| 6,289,628 | B1 | 9/2001 | Perez | |
| 2005/0033353 | A1 * | 2/2005 | Jones | 606/205 |

FOREIGN PATENT DOCUMENTS

| | | | | |
|---|---|---|---|---|
| FR | 2599937 A3 * | 12/1987 | | 43/53.5 |
| WO | WO-97/04648 A1 * | 2/1997 | | |

\* cited by examiner

FISHHOOK BARB CRIMPING TOOL

CROSS-REFERENCE TO RELATED APPLICATIONS

This application claims the benefit of U.S. Provisional Application No. 60/554,854, filed Mar. 19, 2004.

STATEMENT REGARDING FEDERALLY SPONSORED RESEARCH OR DEVELOPMENT

Not Applicable

BACKGROUND OF THE INVENTION

1. Field of Invention

The present invention pertains to the field of fishing. More particularly, this invention is a tool for crimping the barb of a fishhook in order to better facilitate fishermen in releasing fish with minimal injury to the fish.

2. Description of the Related Art

In the field of fishing, it is well know that conventional fishhooks are configured to define a rearwardly-extending barb at the distal end thereof in order to set the hook once a fish has attempted to swallow the bait. In the sport of fishing, once a fish bites the bait, the fisherman sets the hook in the mouth of the fish by gently yanking the rod back, thus engaging the hook in the mouth of the fish. Once the barb has passed through the fish, the hook is set. In order to remove the hook, the hook is backed out of the fish, with the barb further injuring the fish. In many instances, removing the hook can cause more harm to the fish than setting the hook.

It is also well known in the sport of fishing that many fishermen catch and release fish simply for the enjoyment of catching the fish. In such situations, it is desirable to do minimal damage to the fish, and to cause as little trauma to the fish as necessary.

Several devices have been developed to overcome these and similar problems associated with catch-and-release fishing. Typical of the art are those devices disclosed in the following U.S. patents:

| U.S. Pat. No. | Inventor(s) | Issue Date |
| --- | --- | --- |
| 3,624,690 | J. G. Ashley | Nov. 30, 1971 |
| 3,841,014 | T. A. Thomas, Jr. et al. | Oct. 15, 1974 |
| 4,570,373 | J. D. Brief | Feb. 18, 1986 |
| 4,858,371 | H. W. Preiser | Aug. 22, 1989 |
| 4,899,482 | C. D. Gerdes | Feb. 13, 1990 |
| 4,998,375 | J. H. Mitchell | Mar. 12, 1991 |
| 5,097,622 | A. J. James | Mar. 24, 1992 |
| 5,685,108 | J. B. LaPage et al. | Nov. 11, 1997 |
| 6,272,709 | T. J. Strini | Aug. 14, 2001 |
| 6,289,628 | F. Perez | Sep. 18, 2001 |

For example, Ashley ('690) discloses a fishhook having a retractable barb. The hook defines a hollow sleeve in which is disposed a spring wire member. The spring wire member defines a barb extending from an opening in the distal end of the hook. The proximal end of the spring wire extends from the proximal end of the hook. Once the hook has been set, the proximal end of the spring wire member is inserted further into the hollow sleeve, forcing the distal end of the spring member into a cavity in the distal end of the hook. In so doing, the barb is retracted into the hollow sleeve and the hook is then removed from the fish. J. H. Mitchell ('375) discloses a fishhook having a retractable barb.

In the '014 patent, Thomas, Jr. et al., disclose a device configured to be attached to a fishhook in order to render the barb ineffective. The device is attachable to the end of a fishhook shank or to the eye of the hook. A loop portion of the device conforms generally to the bight of the fishhook. A tip is adapted to engage the barb of the fishhook. The tip engages the barb on the such that the barb is shielded from engagement with the fish in order to allow removal of the hook without causing further injury to the fish.

Brief, in the '373 patent, discloses a barbless fishhook. The '373 fishhook includes a shank portion defining a hook portion at one end and an eyelet at the other end thereof. A guard member is formed of spring wire. The guard member is secured to the shank portion and extends toward the point of the fishhook. The guard member is deflected away from the point when the hook is set in a fish, and prevents a fish from being dislodged from the hook. The guard member is engaged to release the fish from the hook member.

The '371 patent issued to Preiser discloses a retractable, barbless fishhook. The Preiser fishhook generally includes a hollow body portion open at each end. A barbless bend segment of a shank is fully retractable within one end of the body portion. The distal end of the bend segment carries a sharpened point and the proximal end of the bend segment is linked to a flexible shank which is slidably movable within the longitudinal channel of the body portion. An eye is defined by the proximal end of the shank on the outside of the body portion. A biasing element is carried within the longitudinal channel of the body portion and surrounds a portion of the shank to return the bend segment, after retraction, to a fully extended position.

The '622 patent issued to James discloses a barbless fishhook assembly. The assembly is comprised of a hook body having an eye, a shank and a curved bend terminating in a tip and a sleeve of material disposed on the curved bend of the hook body proximate the tip, preferably in an area of reduced cross-section. The sleeve of material is caused, by frictional engagement, to gather against itself against the interior layer in the mouth or internal flesh of the fish. James states that this element provides greater holding power than that associated with the barb of a conventional fishhook.

LaPage et al, ('108) disclose a barbless fishhook claiming improved catch-and-release characteristics. The fishhook defines two depressions with sharp leading edges in the wire of the hook.

In the '628 patent, Perez discloses a fishhook having a shank and an integral curved bend portion terminating in a spear portion ending in a sharp point. The spear portion has an axis generally parallel to the shank with a generally uniform cross-section. The spear has a side facing the shank having a rounded barbed portion between the point and the curved bend portion.

Gerdes, in the '482 patent, discloses a modified hemostat adapted to be used as a multipurpose fishing tool. The '482 device includes a clamping section, a fulcrum and handles. A first pair of extensions each defines a flat-edge and is is positioned to the rear of a toothed section, which is immediately behind the fulcrum and toward the handles. A second pair of extensions, one with a flat edge and one with a sharpened edge, is welded to the handles. In one embodiment, one of each of the first and second pairs of extensions are integrally formed with each other to form a single extension. A fishing line is readily gripped or cut with minimum damage by placing the line between the sharpened edges of the second pair of extensions and then pressing the finger loops inwardly. A split shot can be opened by placing the cut side adjacent the sharpened extension and pressing it against the flat edge of the cooperating flat extension by pressing the finger loops together.

In the '709 patent, Strini discloses a multipurpose fishing tool for tying knots. The '709 tool includes a pair of forceps modified by adding an annular groove around the nose of the forceps. The grove is of sufficient depth to retain a loop of fishing line, which is twisted as the forceps jaws are moved in a rotary motion.

BRIEF SUMMARY OF THE INVENTION

The present invention is a tool for crimping the barb defined by a conventional fishhook is disclosed. The fishhook barb crimping tool is comprised generally of a pair of forceps on which is carried a barb crimping element. The tool is provided for modifying a conventional fishhook to allow a fisherman to catch fish in a catch-and-release manner without causing undue harm to the fish, and without requiring the purchase of more expensive hooks configured specifically for this sport.

The tool is a pair of forceps adapted to include a fishhook barb crimping device. The forceps include first and second arms pivotally mounted to one another at a fulcrum. A first end of each arm defines a selected configuration, with each of the first ends defining an interior face. The interior faces of the two arms cooperate to form a clamp. A second end of each of the arms defines a finger loop. A locking device is provided for locking the arms together such that the interior faces of the first ends contact each other in a mating and locked manner.

A barb crimping element is comprised of a first head carried by the first arm and a second head carried by the second arm between the fulcrum and the finger loops, and preferably proximate the fulcrum. The first and second heads are configured to define an interior face, the two interior faces being configured to cooperate to engage when the finger loops are engaged toward a locked position.

To crimp a fishhook barb, the conventional fishhook is positioned such that the barb is disposed between the first and second barb crimping heads. The finger loops are then engaged and pivoted to a closed position such that the barb is engaged with the interior face of either of the first or second heads and the outside of the hook is engaged with the interior face of the other head. The finger loops are engaged until the barb is crimped, rendering the point of the hook ineffective.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A tool for crimping the barb defined by a conventional fishhook is disclosed. The fishhook barb crimping tool of the present invention is illustrated generally at 10 in the figures. The fishhook barb crimping tool, or tool 10, is comprised generally of a pair of forceps on which is carried a barb crimping element 40. The tool 10 is provided for modifying a conventional fishhook 60 to allow a fisherman to catch fish in a catch-and-release manner without causing undue harm to the fish, and without requiring the purchase of more expensive hooks configured specifically for this sport.

Figure 1:
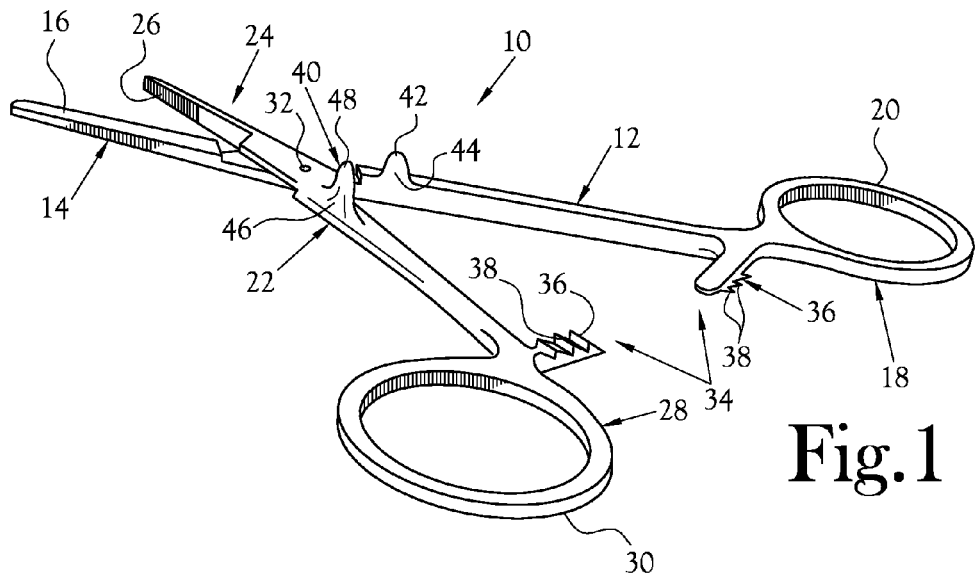
FIG. 1 is a perspective view of a tool for crimping a barb of a conventional fishhook, showing several features of the present invention.

FIG. 1 is a perspective view of the tool 10 of the present invention. The tool 10 is a pair of forceps adapted to include a fishhook barb crimping device 40. The forceps 10 include first and second arms 12,22 pivotally mounted to one another at a pivot point, or fulcrum 32. A first end 14,24 of each arm 12,22 defines a selected configuration, with each of the first ends 14,24 defining an interior face 16,26. The interior faces 16,26 of the two arms 12,22 cooperate to form a clamp. While illustrated as being generally elongated, the clamp may define any angled or hooked configuration as required by the fisherman for a particular application. A second end 18,28 of each of the arms 12,22 defines a finger loop 20,30. A locking device 34 is provided for locking the arms 12,22 together such that the interior faces 16,26 of the first ends 14,24 are contacting each other in a mating and locked manner. In the illustrated embodiment, the locking device 34 includes two notched extensions 36, with one each extending the second end 18,28 from the arms 12,22 proximate the finger loops 20,30. Each of the notched extensions 36 defines a plurality of notches 38, with the notches 38 of the notched extension 36 defined by the first arm 12 being configured to releasably interlock with the notches 38 of the notched extension 36 defined by the second arm 22.

Figure 2:
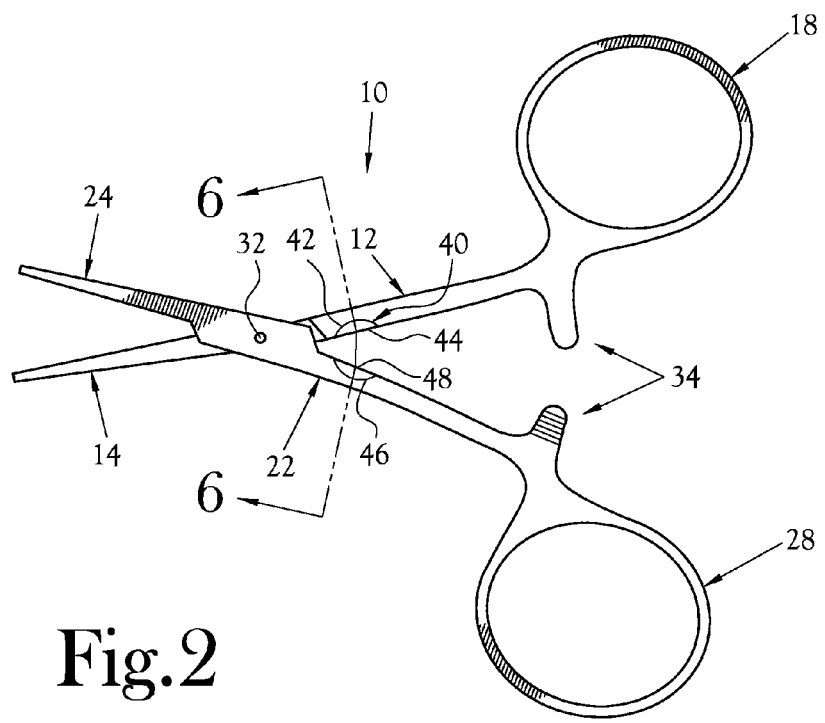
FIG. 2 is a top plan view of the tool of FIG. 1.

A barb crimping element 40 is comprised of a first head 42 carried by the first arm 12 and a second head 46 carried by the second arm 22. The barb crimping heads 42,46 are disposed between the fulcrum 32 and the finger loops 20,30, and preferably proximate the fulcrum 32. The first and second heads 42,46 are configured to define an interior face 44,48, the two interior faces 44,48 being configured to cooperate to engage when the finger loops 20,30 are engaged toward a locked position. The first and second heads 42,46 are further configured such that the interior faces 44,48 extend above the respective first and second arms 12,22. In the illustrated embodiment, as best shown in FIG. 2, the interior face 44 of the first head 42 is coplanar with the interior face 16 defined by the first end 14 of the first arm 12. Similarly, the interior face 48 of the second head 46 is coplanar with the interior face 26 defined by the first end 24 of the second arm 22. However, it will be understood by those skilled in the art that the first and second heads 42,46 may alternately be configured such that the interior faces 44,48 thereof are offset from a centerline of the tool 10. Further, while the interior faces 44,48 are illustrated as defining a planar configuration, it will be understood that other configurations adapted to engage and crimp the barb 62 of a conventional fishhook 60 are useful as well.

Figure 3:
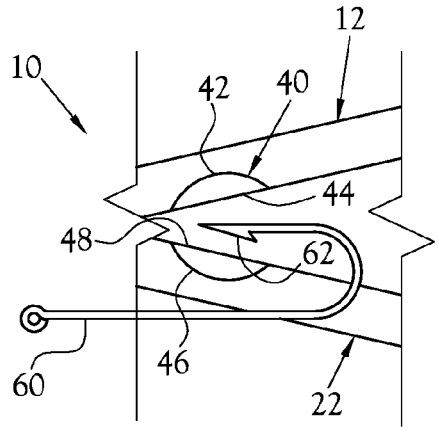
FIG. 3 is a partial top plan view of the tool of FIG. 1, showing a conventional fishhook being positioned such that the barb thereof is disposed between the heads if the barb crimping element.
Figure 4:
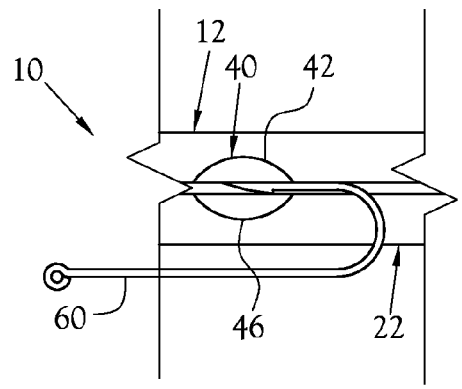
FIG. 4 is a partial top plan view of the tool as illustrated in FIG. 3, showing the barb crimping element being closed to crimp the fishhook barb.
Figure 5:
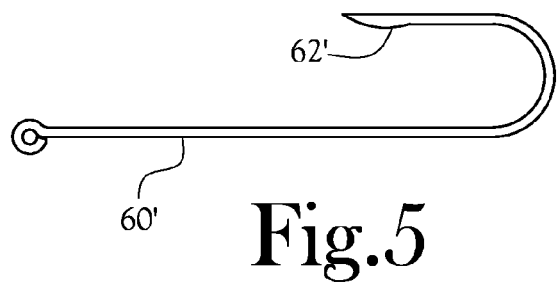
FIG. 5 illustrates a fishhook after the barb has been crimped using the tool of FIG. 1.

As illustrated in FIGS. 3–5, the tool 10 of the present invention is useful in crimping the barb 62 of a conventional fishhook 60, thereby reducing injury to the fish when the fishhook 60 is removed. As illustrated in FIG. 3, the conventional fishhook 60 is positioned such that the barb is disposed between the first and second barb crimping heads 42,46. The finger loops 20,30 are then engaged and pivoted to a closed position such that the barb 62 is engaged with the interior face 44,48 of either of the first or second heads 42,46 and the outside of the hook 60 is engaged with the interior face 44,48 of the other head 42,46. This is illustrated in FIG. 4. The finger loops 20,30 are engaged until the barb 62 is crimped, rendering the point of the hook 60 ineffective.

FIG. 5 illustrates a fishhook 60' with a barb 62' that has been crimped using the tool 10 of the present invention. As illustrated, a raised portion 62' is now defined as a result of the barb 62 having been crimped. While the point of the barb 62' is ineffective for retaining a fish on the fishhook 60', the raised portion assists in retaining the fish. When the fish is removed from the fishhook 60', injury to the fish beyond the initial hooking of the fish is limited if not eliminated.

Figure 6:
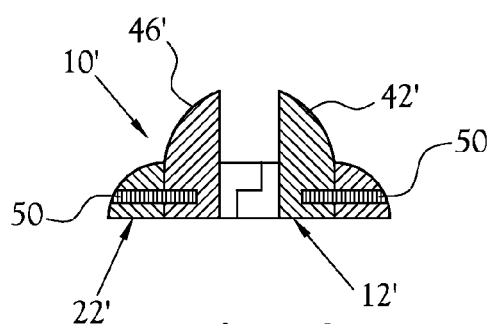
FIG. 6 is an end view, in section, of an alternate embodiment of the tool of the present invention, showing the barb crimping element heads being removably secured.

In the illustrated embodiment of FIGS. 1–5, the first and second fishhook crimping heads 42,46 are illustrated as being integrally formed with the respective first and second arms 12,22. In the illustrated embodiment of FIG. 6, the first and second heads 42',46' are removably secured to the first and second arms 12',22' by conventional manner, such as by screws 50. By providing a releasable assembly, the heads 42',46' may be replaced if damaged, or may be replaced with heads 42',46' of another configuration when required for a particular application.

From the foregoing description, it will be recognized by those skilled in the art that a tool for crimping the barb of a conventional fishhook has been provided. A method for using the tool for crimping the barb of a conventional fishhook has also been provided. By using the tool of the present invention in the manner described, a fisherman is able to catch-and-release fish while causing minimal injury to the fish. More specifically, injury to the fish as a result of removing the fishhook for the fish is minimized. 1

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

Having thus described the aforementioned invention, we claim:

1. A tool for crimping a barb defined by a conventional fishhook, said tool comprising:
   a pair of forceps including:
      a first arm having a first end defining an interior face and a second end defining a finger loop;
      a second arm having a first end defining an interior face and a second end defining a finger loop, said second arm being pivotally mounted to said first arm at a fulcrum, said fulcrum defining a pivot axis, said first arm interior face and said second arm interior face cooperating to form a clamp; and
      a locking device for locking said first and second arms together such that said first arm interior face and said second arm interior face are contacting each other in a mating and locked manner; and
   a barb crimping mechanism carried by said forceps for crimping the conventional fishhook barb, said barb crimping mechanism including:
      a first head carried by said first arm and disposed between said fulcrum and said first arm finger loop, said first head defining an interior face extending orthogonally away from said first arm and parallel to said pivot axis, said first head interior face being coplanar with said first arm interior face; and
      a second head carried by said second arm and disposed between said fulcrum and said second arm finger loop, said second head defining an interior face extending orthogonally away from said second arm and parallel to said pivot axis, said second head interior face being coplanar with said second arm interior face and configured to mate and cooperate with said first head interior face when said locking device is engaged,
   whereby a fish caught on the fishhook with a crimped barb is released without causing undue harm to the fish.

2. The tool of claim 1 wherein said first head and said second head are integrally formed with said first arm and said second arm, respectively.

3. The tool of claim 1 wherein said first head and said second head are removably secured to said first arm and said second arm.

4. The tool of claim 1 wherein said barb crimping mechanism is disposed proximate said fulcrum.

5. Improved fishing forceps for crimping a barb defined by a conventional fishhook, the fishing forceps including a first arm having a first end defining an interior face and a second end defining a finger loop, a second arm having a first end defining an interior face and a second end defining a finger loop, the second arm being pivotally mounted to the first arm at a fulcrum, said fulcrum defining a pivot axis the first arm interior face and second arm interior face cooperating to form a clamp, and a locking device for locking the first and second arms together such that the first arm interior face and the second arm interior face are contacting each other in a mating and locked manner, said improvement comprising:
   a barb crimping mechanism carried by said forceps for crimping the conventional fishhook barb, said barb crimping mechanism including:
      a first head carried by said first arm and disposed between said fulcrum and said first arm finger loop, said first head defining an interior face extending orthogonally away from said first arm and parallel to said pivot axis, said first head interior face being coplanar with said first arm interior face; and
      a second head carried by said second arm and disposed between said fulcrum and said second arm finger loop, said second head defining an interior face extending orthogonally away from said second arm and parallel to said pivot axis, said second head interior face being coplanar with said second arm interior face and configured to mate and cooperate with said first head interior face when said locking device is engaged
   whereby a fish caught on the fishhook with a crimped barb is released without causing undue harm to the fish.

6. The improved fishing forceps of claim 5 wherein said first head and said second head are integrally formed with the first arm and the second arm, respectively.

7. The improved fishing forceps of claim 5 wherein said first head and said second head are removably secured to the first arm and the second arm.

8. The improved fishing forceps of claim 5 wherein said barb crimping mechanism is disposed proximate the fulcrum.

9. A method for crimping a barb defined by a conventional fishhook using a pair of forceps including a first arm having a first end defining an interior face and a second end defining a finger loop, a second arm having a first end defining an interior face and a second end defining a finger loop, the second arm being pivotally mounted to the first arm at a fulcrum, said fulcrum defining a pivot axis the first arm interior face and second arm interior face cooperating to form a clamp, and a locking device for locking the first and second arms together such that the first arm interior face and the second arm interior face are contacting each other in a mating and locked manner, and a barb crimping mechanism carried by said forceps for crimping the conventional fishhook barb, said barb crimping mechanism including a first head carried by said first arm and disposed between said fulcrum and said first arm finger loop, said first head defining an interior face extending orthogonally away from said first arm and parallel to said pivot axis, said first head interior face being coplanar with said first arm interior face, and a second head carried by said second arm and disposed between said fulcrum and said second arm finger loop, said second head defining an interior face extending orthogonally away from said second arm and parallel to said pivot axis, said second head interior face being coplanar with said second arm interior face and configured to mate and cooperate with said first head interior face when said locking device is engaged said method comprising the steps of:

(a) placing the barb of the fishhook within the barb crimping mechanism;

(b) engaging the finger loops to close the forceps; and (c) engaging one of said first head interior face and said second head interior face of said barb crimping mechanism to crimp the barb whereby as said finger loops are engaged, the barb is crimped and rendered ineffective whereby a fish caught on the fishhook is released without causing undue harm to the fish.

* * * * *